July 28, 1964 L. R. TIFT ETAL 3,142,490
MATERIAL SPREADER AND CONTROL SYSTEM
Filed June 3, 1963 2 Sheets-Sheet 2

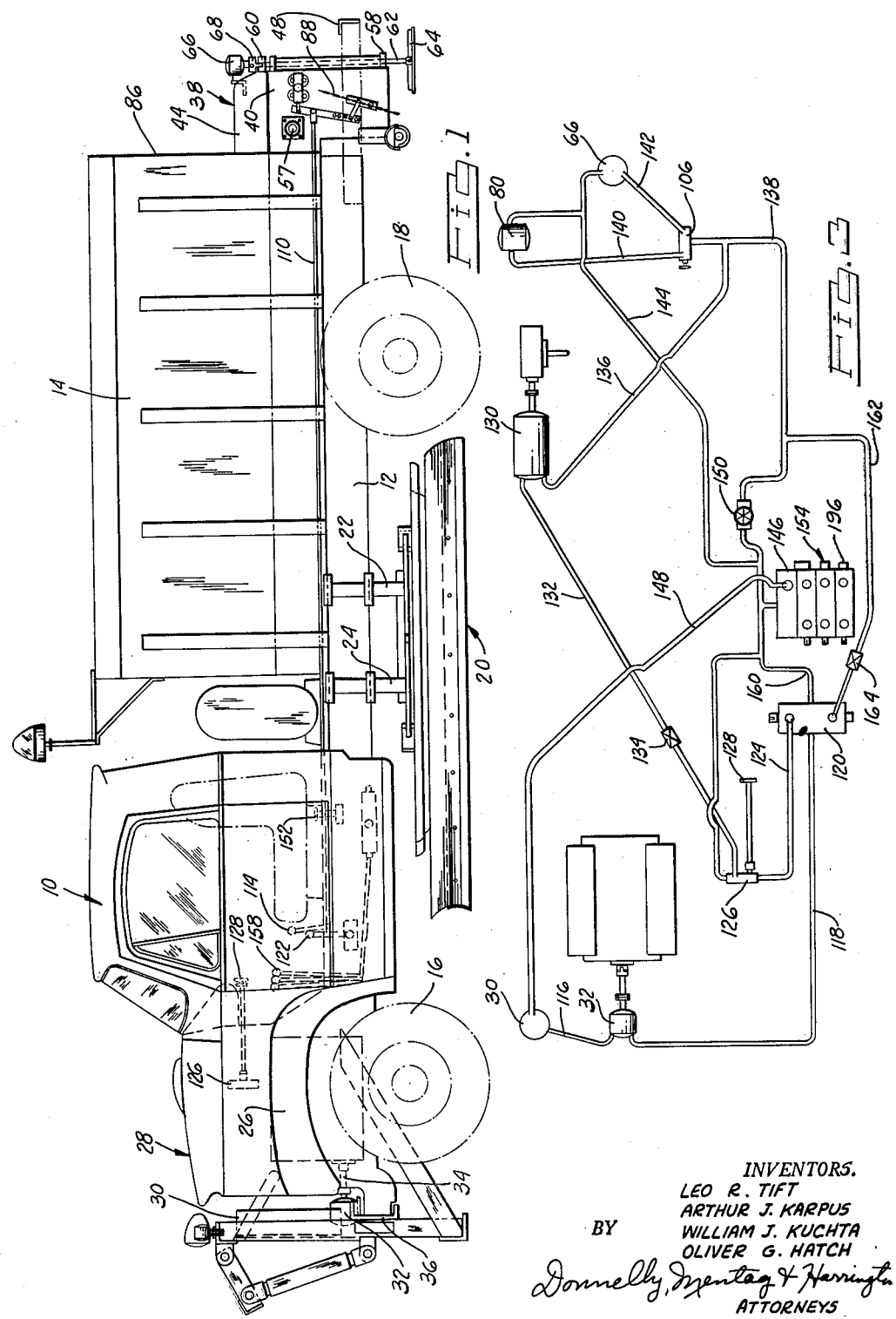

INVENTORS.
LEO R. TIFT
ARTHUR J. KARPUS
WILLIAM J. KUCHTA
OLIVER G. HATCH
BY Donnelly, Mentag & Harrington
ATTORNEYS

3,142,490
MATERIAL SPREADER AND CONTROL SYSTEM

Leo R. Tift, Hastings, Arthur J. Karpus and William J. Kuchta, Lansing, and Oliver G. Hatch, Cassopolis, Mich., assignors to James M. Hare, Secretary of State, State of Michigan, on behalf of the State of Michigan
Filed June 3, 1963, Ser. No. 284,940
7 Claims. (Cl. 275—2)

Our invention relates generally to material spreader trucks, and more particularly to a material spreader comprising an auger portion and a spinner disc portion wherein provision is made for selectively operating one portion while the other portion remains inoperative.

We contemplate that the spinner portion and the auger portion can be operated by means of fluid motors and a hydraulic control valve circuit, the latter being under the control of the vehicle operator at all times. The spreader includes a conventional V-shaped body which serves as a reservoir for the material that is employed. We contemplate that either salt or sand can be accommodated by our mechanism for conditioning highways that have become covered with snow or ice.

A conveyor mechanism situated at the base of the V-shaped body carries the material to a chute situated at the rearward portion of the vehicle. A guide plate is situated within the chute and its angularity can be adjusted by the vehicle operator from within the cab so that the material will be directed either into the auger or upon the spinner disc. In this way, a controlled distribution of the material can be accomplished without the necessity for the vehicle operator to stop the vehicle upon the highway and make mechanical adjustments of the spreader mechanism in the usual fashion. If it is desired to spread salt or sand along the centerline of the highway, the operator can employ the auger portion of the mechanism. If a wider distribution is desired, the spinner disc portion can be employed in lieu of the auger portion.

Separate hydraulic motors disposed in a fluid system are employed for powering the auger and the spinner disc. An interlock is provided between the material guide disc and a selector valve that forms a portion of the circuit so that the auger motor and the spinner motor are actuated and deactivated selectively as an appropriate adjustment is made in the angularity of the material guide plate.

The provision of an improved spreader assembly of the type above set forth being a principal object of our invention, it is a further object of our invention to provide such a mechanism wherein provision is made for powering the auger and spinner disc portions of the mechanism by means of independent fluid motors that are under the control of the vehicle operator from within the vehicle cab.

It is a further object of our invention to provide a control valve circuit for a spreader mechanism of the type above set forth wherein provision is made for varying both the density and distribution of the material by controlling the speed of either the auger motor or the spinner disc motor. This may be done by making a simple adjustment of valve elements that form a part of the circuit.

We contemplate that the hydraulic control valve circuit will include a pressure source in the form of a positive displacement pump that is located at the forward end of the vehicle chassis and directly coupled to the vehicle engine crankshaft. This location makes it possible for the pump to run uniformly without interference with the vehicle drive line. This is in contrast to the conventional arrangement that includes a vehicle power transmission power take-off shaft for powering a shaft that in turn is drivably coupled to a hydraulic pump of a system having pressure operated components. The provision of such an improved arrangement is another object of our invention.

It is a further object of our invention to provide a mobile material spreader for highway use wherein the density and distribution of the spread can be regulated by the vehicle operator from within the cab to meet varying requirements as different road conditions are encountered.

For the purpose of describing more particularly our improved mechanism, reference will be made to the accompanying drawings wherein, FIG. 1 shows a side elevational view of a material spreader truck that embodies improvements of our invention;

FIG. 3 is a schematic diagram showing a control valve system that forms a part of the spreader mechanism.

Figure 4:
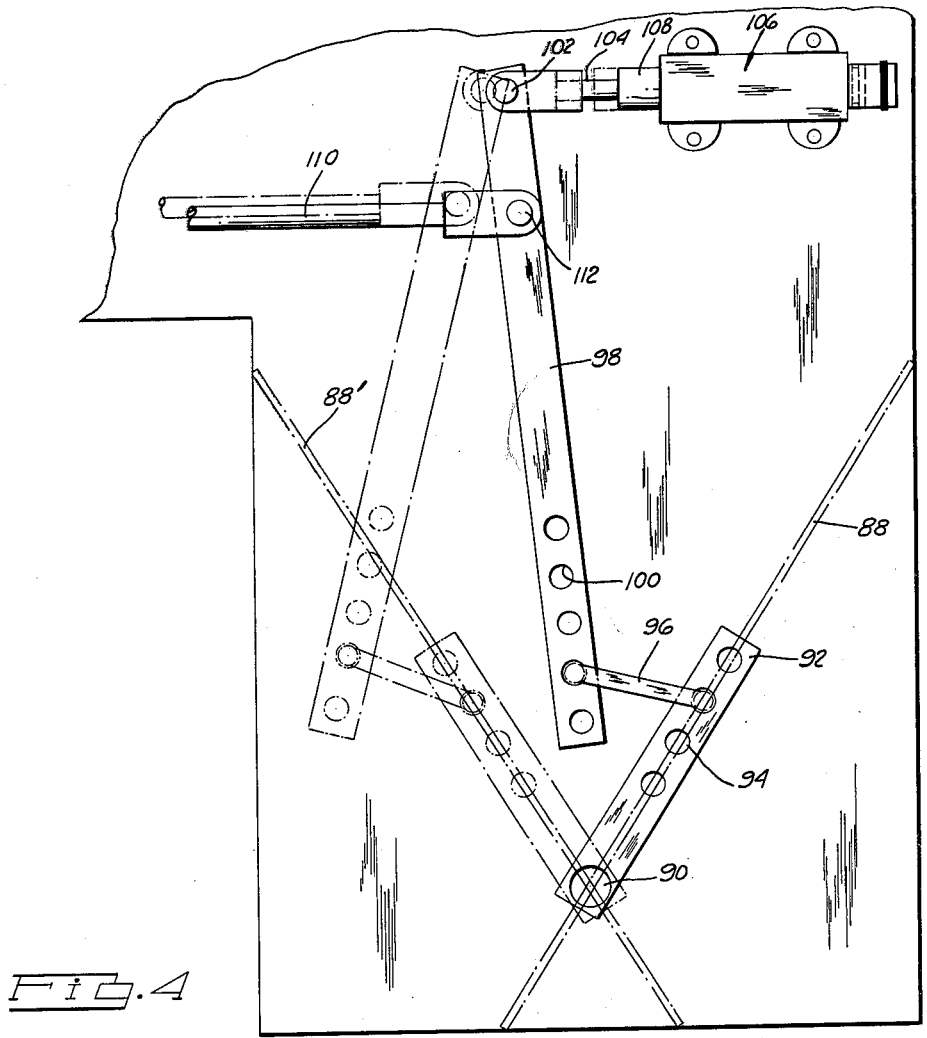
FIG. 4 is an enlarged view of a portion of the structure of FIG. 1 showing a mechanical linkage for actuating the material guide plate.

Referring first to FIG. 1, we have shown a spreader truck that includes a cab 10 and a chassis having a frame 12. Supported upon the frame 12 is a V-shaped body 14 which is adapted to receive material such as salt or sand. The forward dirigible wheels for the vehicle are shown at 16 and the rear traction wheels are shown at 18. Situated beneath the frame 12 and between the wheels 16 and 18 is a scraper blade and plow assembly 20. This assembly is supported by structures 22 and 24 from the frame 12.

The vehicle engine is schematically shown at 26. It is housed within the engine compartment 28 and supported by the frame in a conventional fashion.

Mounted forward of the engine is a storage tank 30 for the hydraulic fluid that is used in the control valve system subsequently to be described with reference to FIG. 3.

A hydraulic pump 32 is coupled to the crankshaft of engine 26 by means of a coupling shaft 34. It is supported upon a bracket 36 which in turn is fixed to the frame 12.

Mounted at the rearward end of the body 14 is a chute generally indicated by reference character 38. It includes two side panels 40 and 42 and an upper closure plate 44. Disposed between the margin of plates 40 and 42 is a rearward plate 46. The rear bumper for the vehicle, shown at 48, is connected to the frame 12.

A conveyor mechanism of conventional construction may be provided within the body 14 at the base of the V-shaped sides thereof. The conveyor is driven by means of a fluid motor, subsequently to be described. The motor has a power output shaft that is connected to a reduction gear unit 50. This unit 50 is supported upon brackets 52, 54 and 56 which are secured in fixed fashion to the side 42 of the chute 38.

A power output shaft for the reduction gear unit 50 is shown at 57. It extends through the chute 38 and is coupled in conventional fashion by means of sprockets to a drive chain for the conveyor located within the body 14. Reference may be made to United States Letters Patent No. 2,799,510 for a description of a typical chain driven conveyor that may be employed in this environment.

Secured to the plate 46 is a pair of vertically spaced brackets 58 and 60. These rotatably journal a spinner disc drive shaft 62. A spinner disc 64 is located at the lower extremity of the shaft 62. The upper end of the shaft 62 is connected to a driving fluid motor 66, the power output shaft of which is coupled to the shaft 62 by means of a coupling 68. It will be apparent, therefore, that when the fluid motor is actuated the spinner disc 64 will rotate about a vertical axis. The disc 64 is located directly under the chute 38 and will receive material that is distributed to the chute 38 by the conveyor within the body 14.

Secured also to the lower end of the chute 38 is an auger housing 70 which is in the form of a cylindrical tube. This tube is open in the region directly under the chute 38 so that the material that is passed downwardly through the chute 38 may be received by the auger assembly.

The auger assembly includes a pair of spaced bushings 72 and 74 which are supported by the tube 70. These bushings in turn support auger shaft 76 which is coupled by means of a coupling 78 to a fluid driving motor 80.

Figure 2:
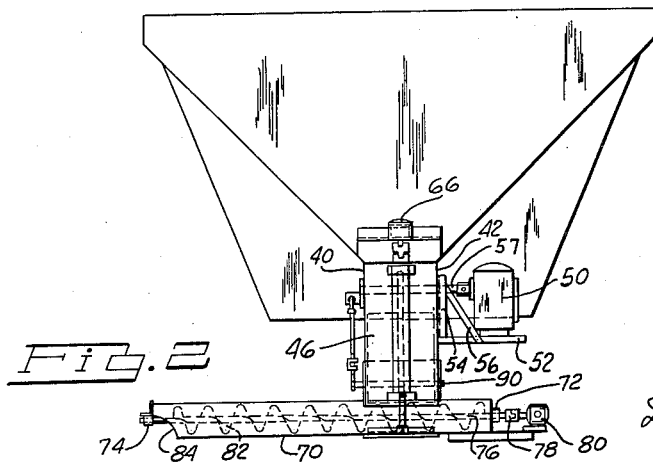
FIG. 2 is a partial rear end view of the truck of FIG. 1.

An auger blade 82 is carried by the shaft 76. The left hand end of the tube 70 is opened as shown at 84 in FIG. 2, so that the material that is received from the chute 38 may be carried in a left hand direction and discharged through the opening 84. It then drops to the pavement.

As the salt or sand is discharged it is deposited near the centerline of the highway. A gate opening behind the cover plate 44 at the rearward extremity 86 of the body 14 permits the salt or sand to be carried by means of the conveyor and dumped into the chute 38.

Situated within the chute 38 is a deflector or guide plate 88 which is mounted upon a pivot shaft 90 for oscillatory movement about a transverse axis. The width of the plate 88 is substantially the same as the width of the chute.

Plate 88 can assume either one of two positions, as indicated in FIG. 4. When it is in a clockwise position, the salt or sand is deflected into the auger tube 70, and from there it is passed in a left hand direction, as viewed in FIG. 2, as explained previously. The plate 88 is adjustably positioned by means of a lever 92 secured to the shaft 90 and mounted externally of the chute 38. This lever 92 includes a series of openings 94, and one end of a link 96 is pivotally joined thereto. The other end of the link 96 is pivotally joined to one end of a second operating lever 98. A series of openings 100 also is provided in this lever to establish a pivotal connection with the link 96. The mechanical motion transmitting ratio between the lever 94 and the lever 98 can be changed as desired by re-locating the ends of the link 96, as appropriate, within the various openings 94 and 100.

The upper end of the lever 98 is pivotally connected at 102 to one end of a supporting rod 104. This rod in turn forms a part of a selector valve assembly 106, the function of which will be explained subsequently. Rod 104 is carried by a movable plunger 108 which forms a part of a spool valve situated within a cooperating valve body.

The lever 98 is connected at an intermediate portion to a manually actuated rod 110 which in turn is pivotally connected, as shown at 112, to the lever 98 by means of a clevis joint. This rod 110 extends longitudinally with respect to the centerline of the vehicle and terminates within the vehicle cab. It may be shifted longitudinally by the vehicle operator by means of a hand lever 114 located in a convenient position within the cab.

If the rod 110 is shifted by the operator in a left hand direction as viewed in FIG. 1, the lever 98 will be pivoted in a clockwise direction as viewed in FIG. 4. This in turn will cause lever 94 to pivot about the axis of shaft 90 thereby moving the plate 88 in a counter-clockwise direction to the position indicated by reference character 88′. When it is in this position it is capable of directing the salt or sand onto the upper surface of the spinner disc 64. If the motor 66 is operating, the salt or sand is spread throughout a relatively large area to provide maximum coverage.

This adjustment of the plate 88 can be accomplished by the vehicle operator while the vehicle is in transit. It is not necessary to stop the vehicle on the highway and make mechanical adjustments in the spreading mechanism as is the usual practice. This greatly adds to the degree of safety of the operator and contributes to working efficiency.

Referring next to FIG. 3, the mode of operation of the control system will be described briefly. The pump 32 receives fluid from the tank 30 through a feed passage 116. It then distributes the fluid under high pressure through a passage 118 to a control valve 120. The operation of the valve 120 is controlled from within the vehicle cab by means of a valve lever 122. It can be adjusted to a first operating position to permit high pressure fluid to pass from passage 118 to passage 124. It is distributed from this passage 124 to a fluid pressure regulator valve 126. The fluid flow through the valve 126 in turn can be controlled by the vehicle operator by means of an adjusting element 128 located within the vehicle cab.

The rate of flow through the valve 126 determines the speed of the fluid motor 130 which powers the reduction gear unit 50 for the conveyor. Fluid is distributed from the valve 126 to the motor 130 through a motor feed passage 132. If desired, a check valve 134 can be introduced into the passage 132 to accommodate flow from the valve 126 to the motor 130 and inhibit flow in a reverse direction.

The speed of the motor 130, of course, can be controlled as desired by the operator, and in this way the density of the spread can be regulated. By referring to a calibration chart within the cab, the density of the spread for any given vehicle speed can be regulated to suit varying road conditions without the necessity for interrupting the spreading operation.

The return flow from the motor 130 passes through the passage 136, which in turn communicates with a passage 138.

A portion of the flow that is distributed to passage 138 passes through the selector valve 106. The position of this valve, as previously explained, is dependent upon the position of the plate 88. If the plate 88 assumes a clockwise position as shown at FIG. 4, the valve 106 will distribute fluid to the auger motor 80 through a feed passage 140. On the other hand, if the plate 88 assumes the other position, oil will be directed by the valve 106 to the spinner disc motor 66 through a passage 142. The discharge sides of the motors 80 and 66 communicate with a return flow passage 144 which in turn communicates with a distributor valve 146. This valve establishes communication between passage 144 and a return passage 148 which communicates with the tank 30. The circuit thus is completed.

The balance of the flow that is distributed to passage 138 passes through a needle valve 150 which functions as a flow control means. The opening of the needle valve 150 can be regulated by the vehicle operator from within the cab by means of an adjusting screw 152. It is thus apparent that the valve 150 will control the amount of fluid distributed to either one or the other of the motors 80 or 66 depending upon which one is in operation at the time.

With a collateral fluid circuit (not particularly shown in detail) it is possible for the operator to control the snow plow or the under body blade. This is done by controlling the movement of one or the other of valve portions 154 or 196 of the valve 146 by means of a driver controlled valve lever 158. When a plowing or scraping operation is desired, fluid is distributed from the pump 32 and through the passage 118 to the valve 120. It is distributed then through passage 160 to the valve 146 and then to the servos for the blade or the plow.

It is possible in this improved arrangement to run the auger for cleaning purposes after the conveyor has stopped operating. This may be done while the engine 26 is running by making an appropriate adjustment of the valve 120. The pressure then is distributed from pump 32, through passage 118 and through the valve 120 to a passage 162. Another check valve 164 is located in this passage 162. Pressure then is fed to the auger motor 80 and returned in the usual fashion through passage 144 to the valve 146 and then to the passage 148 which communicates with the tank 30. The fluid motor 130 is bypassed entirely during this operation.

Having thus described a preferred embodiment of our invention, what we claim and desire to secure by U.S. Letters Patent is:

1. In a material spreader truck having a body for accommodating pavement treating material, a chute mounted at the rearward portion of said body for receiving said material, a spinner disc mounted on said chute for rotation about a vertical axis, an auger assembly comprising a housing secured to the lower portion of said chute and an auger blade rotatably mounted therein, a guide plate pivotally mounted within said chute for oscillatory movement about a transverse axis, said plate being adapted to assume either of two positions and functioning to direct the material into said auger when it assumes one position and onto said spinner disc when it assumes the other position, mechanical linkage means for adjusting said guide plate from one position to the other, first and second motor means for respectively powering said auger assembly and said spinner disc, a source of power for said motors, control means for selectively distributing power from said source to said motors, and an interlock connection between said control means and said linkage means whereby said motors are selectively activated and deactivated as said plate is adjusted appropriately to accommodate distribution of material over the pavement.

2. In a material spreader vehicle having an operator's cab and a body for receiving highway conditioning material, a chute mounted at the rear of said body, said chute being adapted to receive material from said body, a spinner disc mounted for rotation about a vertical axis and disposed under said chute, a first fluid motor means for powering said spinner disc, an auger assembly comprising an auger housing secured to the lower portion of said chute and an auger blade rotatably mounted therein, said auger blade being disposed for rotation about an axis that is transverse with respect to the center line of said vehicle, a second fluid motor means for powering said auger assembly, a guide plate mounted within said chute, means for adjustably positioning said plate about a transverse axis to either one of two operating positions, said plate when it assumes one position being adapted to direct material onto said spinner disc and to direct material into said auger assembly when it assumes the other position, a control rod extending longitudinally with respect to said vehicle into the region of said cab, a driver controlled linkage means for adjusting said guide plate from one position to the other, a fluid pressure source, conduit structure connecting said pressure source to each of said motor means, and a selector valve disposed in and forming a part of said conduit structure including portions mechanically connected to said linkage means for selectively distributing fluid pressure to each of said motor means, whereby said spinner disc is actuated and said auger assembly is deactivated when said plate assumes said one position and whereby said auger assembly is actuated and said spinner disc is deactivated when said plate assumes said other position.

3. In a material spreader vehicle having an operator's cab and a body for receiving highway conditioning material, a chute mounted at the rear of said body, said chute being adapted to receive material from said body, a spinner disc mounted for rotation about a vertical axis and disposed under said chute, a first fluid motor for powering said spinner disc, an auger assembly comprising an auger housing secured to the lower portion of said chute and an auger blade rotatably mounted therein, said auger blade being disposed for rotation about an axis that is transversely disposed with respect to the centerline of the vehicle, a second fluid motor means for powering said auger assembly, a guide plate mounted within said chute, means for adjustably positioning said plate about a transverse axis to either one of two operating positions, said plate when it assumes one position being adapted to direct material onto said spinner disc and to direct the material into said auger assembly when it assumes the other position, a control rod extending longitudinally with respect to said vehicle into the region of said cab, a driver controlled linkage means for adjusting said guide plate from one position to the other, a fluid pressure source, conduit structure interconnecting said pressure source to each motor means, a selector valve disposed in and forming a part of said conduit structure including portions mechanically connected to said linkage means for selectively distributing fluid pressure to each motor means, whereby said spinner disc is actuated and said auger assembly is deactivated when said plate assumes said one position and said auger assembly is actuated and said spinner disc is deactivated when said plate assumes said other position, and flow control valve means disposed in and forming a part of said conduit structure including manually operable portions disposed in said cab for controlling the rate of fluid flow from said pressure source to each of said fluid motor means.

4. In a material spreader vehicle having an engine, an operator's cab and a body for receiving highway conditioning material, a chute mounted at the rear of said body, said chute being adapted to receive material from said body, a spinner disc mounted for rotation about a vertical axis and disposed under said chute, a first fluid motor for powering said spinner disc, an auger assembly comprising an auger housing secured to the lower portion of said chute and an auger blade rotatably mounted therein, said auger blade being disposed for rotation about an axis that is transversely disposed with respect to the centerline of the vehicle, a second fluid motor means for powering said auger assembly, a guide plate mounted within said chute, means for adjustably positioning said plate about a transverse axis to either one of two operating positions, said plate when it assumes one position being adapted to direct material onto said spinner disc and to direct the material into said auger assembly when it assumes the other position, a control rod extending longitudinally with respect to said vehicle into the region of said cab, a driver controlled lever, linkage means for adjusting said guide plate from one position to the other, a fluid pressure pump drivably coupled to said engine near the forward extremity of said vehicle, conduit structure interconnecting said pressure source to each of said motor means, a selector valve disposed in and forming a part of said conduit structure including portions mechanically connected to said linkage means for selectively distributing fluid pressure to each of said motor means, whereby said spinner disc is actuated and said auger assembly is deactivated when said plate assumes said one position and said auger assembly is actuated and said spinner disc is deactivated when said plate assumes said other position, and flow control valve means disposed in and forming a part of said conduit structure including manually operable portions disposed in said cab for controlling the rate of flow from said pressure source to each of said fluid motor means.

5. In a material spreader vehicle having a spreader assembly situated at the rear end thereof, a spinner disc mounted for rotation about a vertical axis, an auger assembly having an auger blade adapted for rotation about a horizontal axis that is transversely disposed with respect to the centerline of said vehicle, first fluid motor means for powering said spinner disc, second fluid motor means for powering said auger blade, a material directing blade adapted to assume either of two operating positions, said blade when it assumes one position being adapted to direct material into said auger assembly and adapted to direct material onto said spinner disc when it assumes the other operating position, a fluid pressure pump, conduit structure interconnecting said pump and each motor means, driver operated mechanical linkage means for adjustably positioning said material directing blade to either of said operating positions, and interlock selector valve means disposed in and partly defining said conduit structure for interrupting the distribution of pressure to the spinner disc motor means and accommodating distribution of pressure to said auger assembly when said material directing blade assumes said one position and for interrupting distribution of fluid pressure to said auger assembly and distributing fluid pressure to said spinner disc motor means when it assumes the other operating position, said interlock valve means including movable valve portions mechanically connected to said linkage means and operated thereby upon adjustment of the latter.

6. In a material spreader vehicle assembly comprising a spreader mechanism situated at the rearward portion of said vehicle and a conveyor for feeding material to said mechanism, said spreader mechanism comprising a chute adapted to receive the material for treatment of a highway, a spinner disc rotatably mounted at the rearward portion of said chute for rotation about a vertical axis, an auger assembly mounted for rotation about a horizontal axis that is transversely disposed with respect to said vehicle, a guide plate adjustably mounted within said chute and adapted to assume either one of two operating positions, first fluid motor means for powering said conveyor, second fluid motor means for powering said auger assembly, third fluid motor means for powering said spinner disc, a fluid pressure source, conduit structure interconnecting said pressure source and each of said motor means and including a first portion for distributing fluid pressure to the auger assembly motor means, a second portion for distributing fluid pressure to the spinner disc motor means and a third portion for distributing fluid pressure to the conveyor motor means, interlock selector valve means disposed in and partly defining said first and second conduit structure portions, a movable valve portion of said selector valve means being mechanically connected to said guide plate whereby pressure distribution to the auger assembly motor means is interrupted and pressure distribution to said spinner disc motor means is established when said guide plate assumes one operating position and wherein pressure distribution to said auger assembly motor means is established and pressure distribution to said spinner disc motor means is interrupted when said guide plate assumes the other operating position, and additional manually operable valve means for interrupting distribution of pressure to said third motor means and establishing a pressure distribution path to said auger assembly motor means to provide independent operation of the latter for auger blade cleaning purposes.

7. In a material spreader truck having a body for accommodating pavement treating material, a chute mounted at the rearward portion of said body for receiving said material, a spinner disc mounted on said chute for rotation about a vertical axis, an auger assembly comprising a housing secured to the lower portion of said chute and an auger blade rotatably mounted therein, a guide plate pivotally mounted within said chute for oscillatory movement about a transverse axis, said plate being adapted to assume either of two positions and functioning to direct the material into said auger when it assumes one position and onto said spinner disc when it assumes the other, an operator controlled linkage means including portions connected to said guide plate for adjustably positioning the same, a fluid pressure source, first drive means including a fluid motor for powering said spinner disc, second drive means including a fluid motor for powering said auger assembly, conduit structure defining a hydraulic connection between said fluid pressure source and each drive means including separate conduit portions connected to each drive means, operator controlled selector valve means communicating with said pressure source and with each conduit portion for selectively distributing control pressure to each drive means, a common return flow path extending from each drive means to a low pressure region of said hydraulic connection, and operator controlled flow restricting valve means disposed in and partly defining said return flow path for regulating the operating speed of said spinner disc and said auger assembly.

References Cited in the file of this patent
UNITED STATES PATENTS

| | | |
|---|---|---|
| 2,705,149 | Torrey | Mar. 29, 1955 |
| 2,774,602 | Sanderson | Dec. 18, 1956 |
| 3,063,723 | Toft | Nov. 13, 1962 |